United States Patent
Huang

(10) Patent No.: US 6,390,746 B1
(45) Date of Patent: May 21, 2002

(54) CARGO POSITIONING DEVICE ALLOWING FINE ADJUSTMENT

(76) Inventor: Han-Ching Huang, P.O. Box 63-247, Taichung (TW)

(*) Notice: Subject to any disclaimer, the term of this patent is extended or adjusted under 35 U.S.C. 154(b) by 0 days.

(21) Appl. No.: 09/710,851

(22) Filed: Nov. 14, 2000

(51) Int. Cl.$^7$ .................................................. B60P 7/15
(52) U.S. Cl. ...................................... 410/151; 410/143
(58) Field of Search .................................. 410/143, 145, 410/151; 211/105.3, 105.4; 248/354.3, 354.6; 254/13

(56) References Cited

U.S. PATENT DOCUMENTS

| | | | | |
|---|---|---|---|---|
| 3,110,506 A | * | 11/1963 | O'Brien | 410/151 |
| 4,343,578 A | * | 8/1982 | Barnes | 410/151 |
| 4,781,499 A | * | 11/1988 | Wisecarver | 410/151 |
| 4,834,599 A | * | 5/1989 | Gordon et al. | 410/151 |
| 5,281,063 A | * | 1/1994 | Austin, III | 410/151 |
| 5,769,580 A | * | 6/1998 | Purvis | 410/151 |
| 5,947,666 A | * | 9/1999 | Huang | 410/151 |
| 6,247,382 B1 | * | 6/2001 | Huang | 410/151 |

* cited by examiner

Primary Examiner—Stephen T. Gordon
(74) Attorney, Agent, or Firm—Rosenberg, Klein & Lee

(57) ABSTRACT

A cargo positioning device comprises an outer tube having a first end with an inner threading for engaging with a first screw. A first end plate is securely attached to the first screw to move therewith. An inner tube has a first end and a second end that is telescopically received in a second end of the outer tube. The first end of the inner tube has an inner threading for threadedly engaging with a second screw. A second end plate is securely attached to the second screw to move therewith. The inner tube further includes a number of longitudinally spaced positioning holes. A pin is removably extended through a transverse hole in the outer tube and one of the positioning holes of the inner tube that is aligned with the transverse hole to thereby secure the inner tube and the second tube together. A fine adjusting device is provided to turn the inner tube and the outer tube that are secured together to cause the screws to move relative to the inner tube and the outer tube.

13 Claims, 6 Drawing Sheets

CARGO POSITIONING DEVICE ALLOWING FINE ADJUSTMENT

BACKGROUND OF THE INVENTION

1. Field of the Invention

The present invention relates to a cargo positioning device that allows fine adjustment.

2. Description of the Related Art

U.S. Pat. No. 5,947,666 to Huang issued on Sep. 7, 1999 discloses a cargo positioning device including an outer tube having a base fixed to an end thereof, a rack-like inner tube having an end slidably received in the outer tube, a gear rotatably supported by the base and meshed with the rack-like inner tube, a handle having an end pivotally connected to the base, and a catch member releasably engaged with a ratchet wheel that is formed on a side of the gear. The handle can be retained in either a first retaining position to prevent from rotation of the gear or a second retaining position to allow rapid outstretching or retraction of the inner tube away from or into the outer tube. The handle is also operable to allow outstretching of the inner tube. Nevertheless, it was found that fine adjustment of the overall length of the cargo-positioning device is impossible.

SUMMARY OF THE INVENTION

It is the primary object of the present invention to provide cargo positioning device that allows fine adjustment.

In accordance with the present invention, a cargo positioning device comprises:

an outer tube having a first end and a second end;

an inner tube having a first end and a second end, the second end of the inner tube being telescopically received in the second end of the outer tube, at least one of the first end of the outer tube and the first end of the inner tube having an inner threading for threadedly engaging with a screw;

means for releasably securing the outer tube and the inner tube together; and means for turning the inner tube and the outer tube that are secure together to cause the screw to move relative to the inner tube and the outer tube.

The inner tube includes a plurality of longitudinally spaced positioning holes. The securing means includes a transverse hole defined in the outer tube and a pin removably extended through the transverse hole and one of the positioning holes of the inner tube that is aligned with the transverse hole.

The turning means includes:

a base having a first end rotatably mounted around the outer tube and a second end;

a ratchet wheel securely mounted around the outer tube to rotate therewith;

a handle having an end engaged with the second end of the base to rotate therewith; and means for turning the ratchet wheel in response to rotation of the handle, thereby causing rotation of the inner tube and the outer tube that are secured together.

The handle is pivotally mounted to the second end of the base. The means of turning the ratchet wheel includes a pawl pivotally mounted to the base. The pawl includes a first engaging section and a second engaging section that are selectively engaged with the ratchet wheel to drive the ratchet wheel in a selected direction. The base further includes a receptacle, an elastic element mounted in the receptacle, and a ball mounted in the receptacle and biased by the elastic element to selectively retain the pawl in one of two positions for determining engagement of the ratchet wheel with one of the first engaging section and the second engaging section of the pawl. The base is U-shape and includes two limbs having aligned holes so as to be rotatably mounted around the outer tube.

In a preferred embodiment of the invention, a cargo positioning device comprises:

an outer tube having a first end and a second end, the first end of the outer tube having an inner threading for engaging with a first screw, a first end plate being securely attached to the first screw to move therewith, the outer tube further including a transverse hole;

an inner tube having a first end and a second end, the second end of the inner tube being telescopically received in the second end of the outer tube, the first end of the inner tube having an inner threading for threadedly engaging with a second screw, a second end plate being securely attached to the second screw to move therewith, the inner tube further including a plurality of longitudinally spaced positioning holes;

a pin removably extended through the transverse hole and one of the positioning holes of the inner tube that is aligned with the transverse hole to thereby secure the inner tube and the second tube together; and means for turning the inner tube and the outer tube that are secured together to cause the first screw and the second to move relative to the inner tube and the outer tube.

The inner threading of the inner tube and the inner threading of the outer tube have opposite leads.

The turning means includes:

a base having a first end rotatably mounted around the outer tube and a second end;

a ratchet wheel securely mounted around the outer tube to rotate therewith;

a handle having an end engaged with the second end of the base to rotate therewith; and means for turning the ratchet wheel in response to rotation of the handle, thereby causing rotation of the inner tube and the outer tube that are engaged together.

The handle is pivotally mounted to the second end of the base. The means of turning the ratchet wheel includes a pawl pivotally mounted to the base. The pawl includes a first engaging section and a second engaging section that are selectively engaged with the ratchet wheel to drive the ratchet wheel in a selected direction. The base further includes a receptacle, an elastic element mounted in the receptacle, and a ball mounted in the receptacle and biased by the elastic element to selectively retain the pawl in one of two positions for determining engagement of the ratchet wheel with one of the first engaging section and the second engaging section of the pawl.

The base is U-shape and includes two limbs having aligned holes so as to be rotatably mounted around the outer tube. The outer tube includes two positioning grooves in an outer periphery thereof. Two C-clips are mounted in the positioning grooves and located outside the limbs of the base to thereby position the base.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
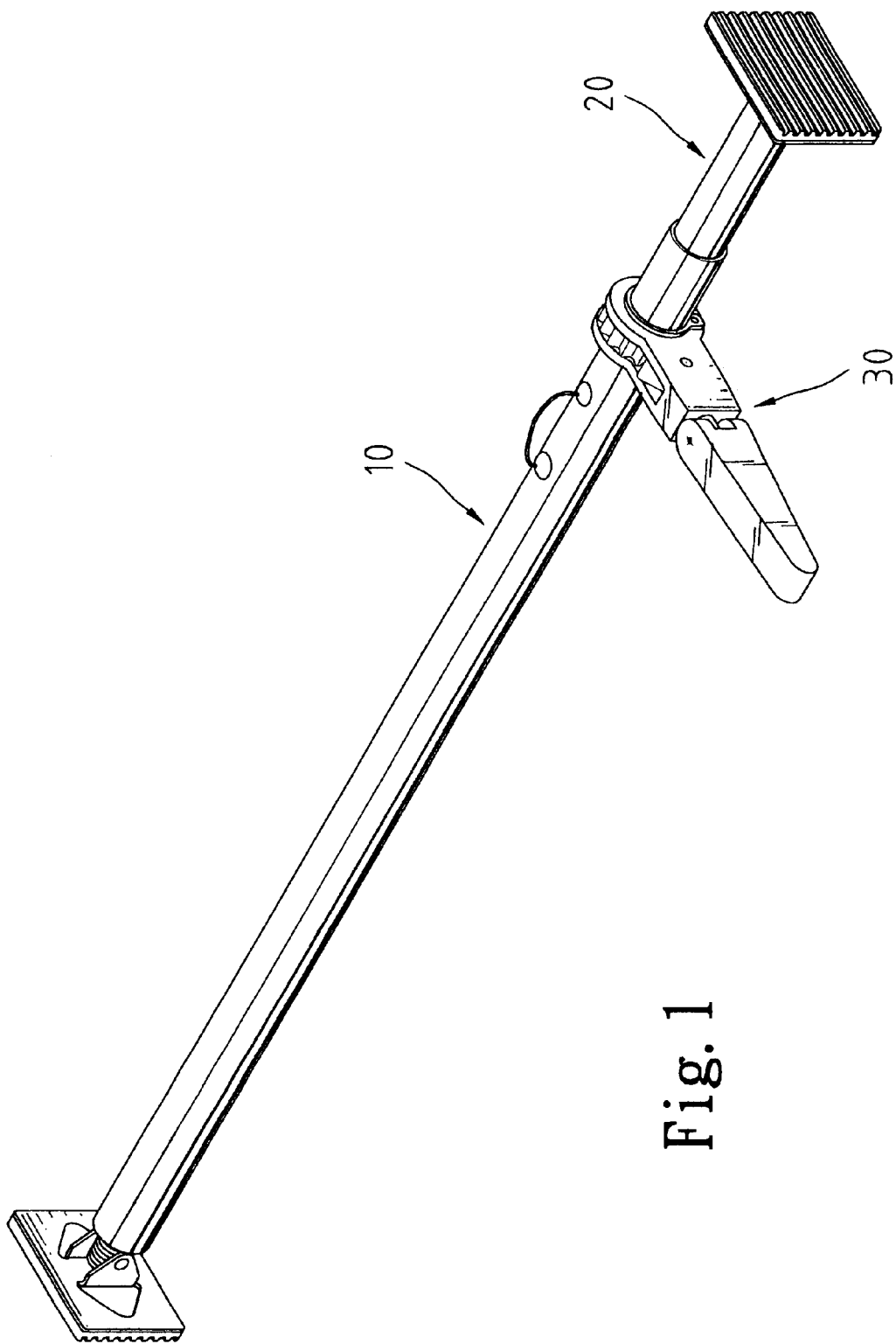
FIG. 1 is a perspective view of a cargo positioning device in accordance with the present invention.
Figure 2:
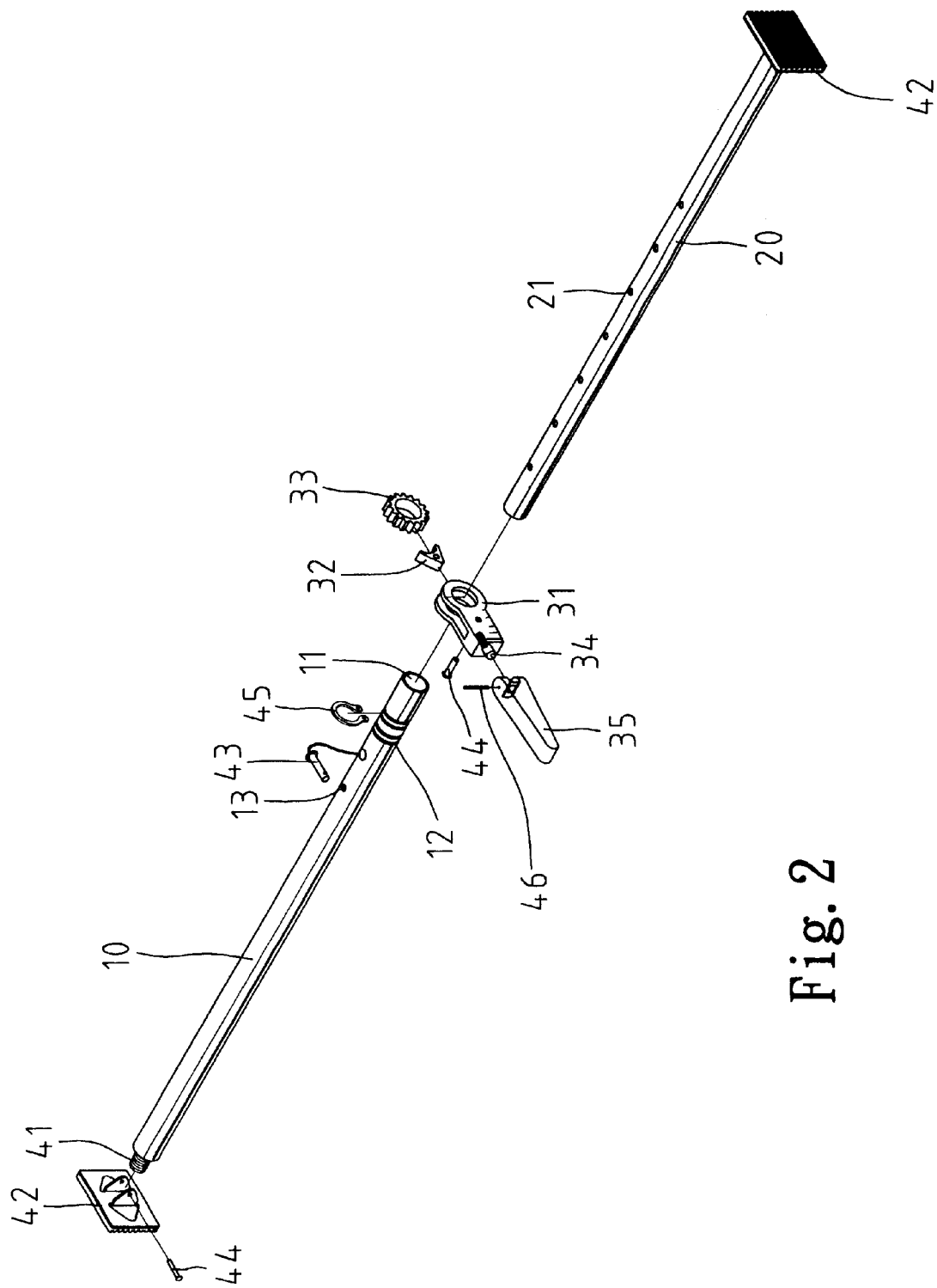
FIG. 2 is an exploded perspective view of the cargo positioning device in accordance with the present invention.
Figure 3:
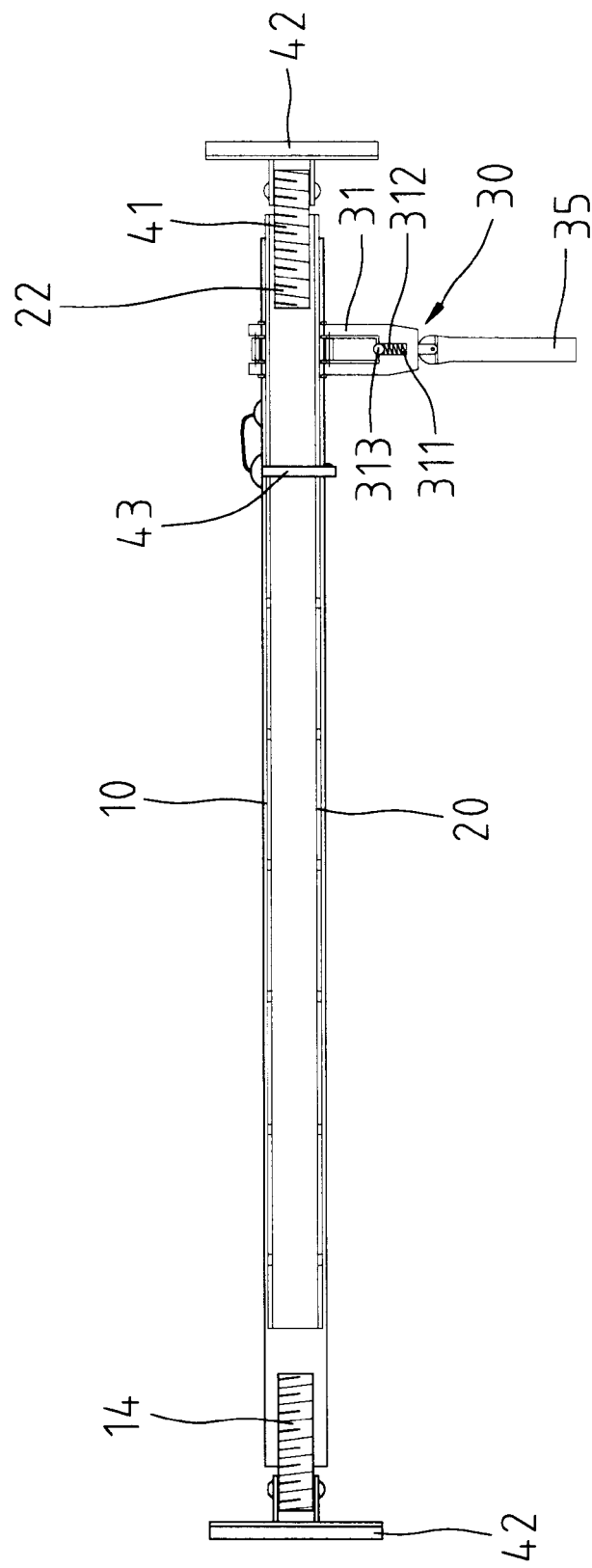
FIG. 3 is a sectional view of the cargo positioning device in accordance with the present invention.

Referring to FIGS. 1 through 3, a cargo positioning device in accordance with the present invention generally includes an outer tube 10, an inner tube 20, and a fine adjustment means 30. The outer tube 10 includes a first end having an inner threading 14 (FIG. 3) for engaging with a screw 41, which in turn, is fixed to an end plate 42 by a pin 44. The outer tube 10 further includes a second end 11, which will be described later. The outer tube 10 further includes a plurality of positioning grooves 12 in an outer periphery thereof and a transverse hole 13.

The inner tube 20 also includes a first end having an inner threading 22 for engaging with a screw 41, which in turn, is fixed to an end plate 42 by a pin 44, best shown in FIG. 3. The inner threading 22 of the inner tube 20 and the inner threading 14 of the outer tube 10 have opposite leads. The inner tube 20 further includes a second end that is telescopically received in the second end 11 of the outer tube 10. The inner tube 20 further includes a plurality of longitudinally spaced positioning holes 21 in a periphery thereof.

Figure 5:
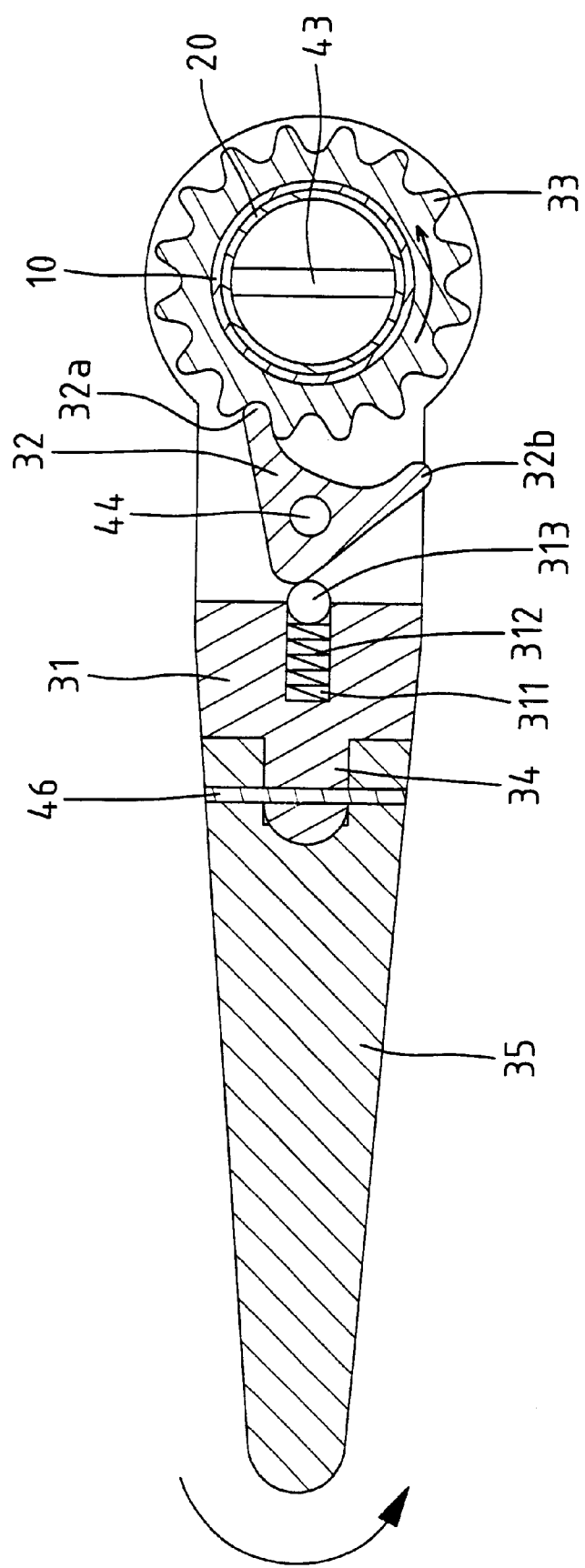
FIG. 5 is a sectional view of a fine adjustment means of the cargo positioning device in accordance with the present invention.

Referring to FIGS. 2 and 5, the fine adjusting means 30 (a turning means) includes a substantially U-shape base 31, a pawl 32, and a ratchet wheel 33. The pawl 32 is pivotally mounted to the base 31 by a pin 44. The U-shape base 31 includes two limbs (not labeled) between which the ratchet wheel 33 is mounted. The limbs of the base 31 have aligned holes (not labeled) so as to be rotatably mounted around the outer tube 10, and the ratchet wheel 33 has a central hole (not labeled) so as to be mounted around the outer tube 10 to rotate therewith. The U-shape base 31 are retained in place by C-clips 45 that are engaged in the positioning grooves 12 in the outer tube 10. The pawl 32 includes a first engaging section 32a and a second engaging section 32b that are selectively engaged with the ratchet wheel 33. A handle 35 is pivotally mounted by a pin 46 to a rear end 34 (which is in the form of a protrusion in this embodiment) of the base 31. As illustrated in FIG. 5, the base further includes a receptacle 311 for receiving an elastic element 312 and a ball 313 for retaining the pawl 32 in one of two operative positions.

Figure 4:
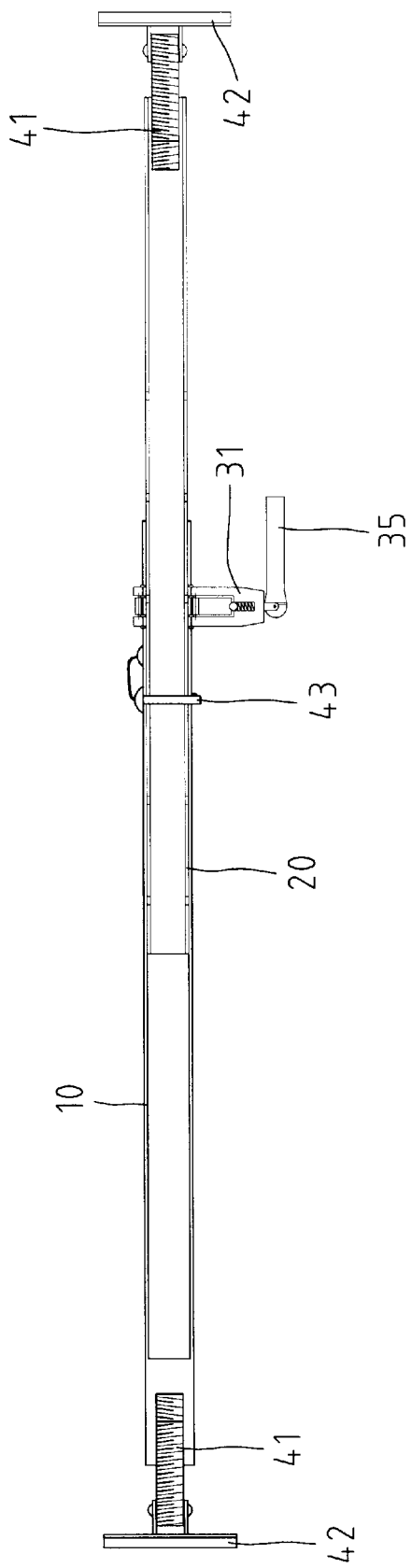
FIG. 4 is a view similar to FIG. 3, wherein the cargo positioning device is in an outstretched position.

In use, the inner tube 20 is outstretched to an extent in response to an overall length or width of cargo to be positioned. The end plate 42 attached to the outer tube 10 bears against one of two inner lateral wall faces (not shown) in a truck or the like, and the end plate 42 attached to the inner tube 20 bears against the other inner later wall face (not shown) in the truck. Then, a positioning pin 43 is extended through the transverse hole 13 in the outer tube 10 and an associated positioning hole 21 of the inner tube 20 that is aligned with the transverse hole 13. Thus, the inner tube 21 and the outer tube 10 are secured together. Next, the user may rotate the handle 35 in a direction (e.g., counterclockwise, see arrow in FIG. 5) to cause the ratchet wheel 33 to turn. It is noted that the pawl 32 engages with the ratchet wheel 33 at its first engaging section 32a thereof. As a result, the outer tube 10/inner tube 20 is also turned. Due to threading engagement between the tubes 10 and 20 and the screws 41, the screws 41 and the end plates 42 are moved outward to press against the inner lateral wall faces of the truck tightly, thereby providing a reliable positioning effect. Thus, the required fine adjustment is required. Rotation of the handle 35 in a reverse direction (clockwise) causes free rotation of the pawl 32 relative to the ratchet wheel 33; namely, the tubes 10 and 20 are not turned. After fine adjustment, the handle 35 may be pivoted about the pin 46 to an inoperative position shown in FIG. 4.

Figure 6:
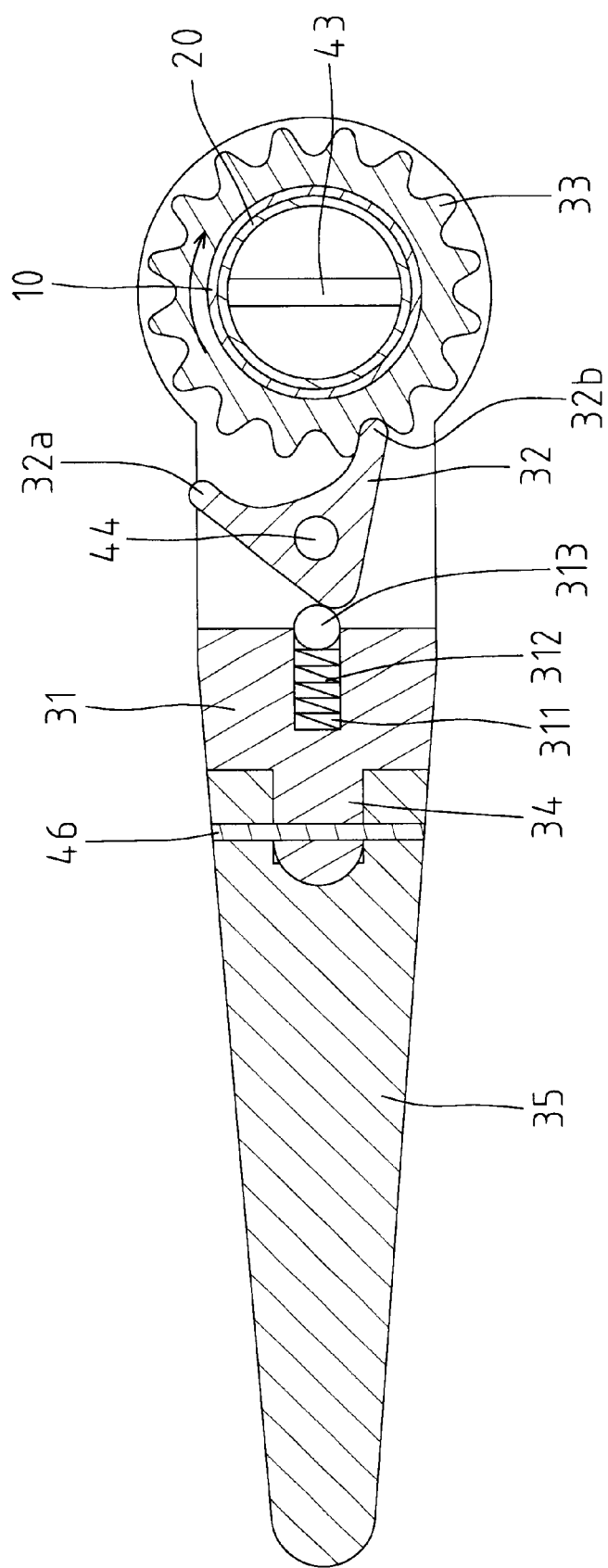
FIG. 6 is a sectional view similar to FIG. 5, wherein a pawl of the fine adjustment means is moved to another position to allow ratcheting in a reverse direction.

When retraction of the inner tube 20 is required, the user may switch the pawl 32 to a position shown in FIG. 6 such that the pawl 32 engages with the ratchet wheel 33 at its second engaging section 32b. Rotation of the handle 35 in a direction (clockwise) causes the ratchet wheel 33 to turn. As a result, the outer tube 10/inner tube 20 is also turned. Due to threading engagement between the tubes 10 and 20 and the screws 41, the screws 41 and the end plates 42 are moved inward to slightly move away from the inner lateral wall faces of the truck tightly. The pin 43 is then removed to allow retraction of the inner tube 20. Rotation of the handle 35 in a reverse direction (counterclockwise) causes free rotation of the pawl 32 relative to the ratchet wheel 33; namely, the tubes 10 and 20 are not turned.

According to the above description, it is appreciated that the cargo positioning device in accordance with the present invention allows fine adjustment to reliably position the cargo positioning device between two opposite wall faces. In addition, relative positioning between the inner tube 20 and the outer tube 10 is reliable by a pin 43 to avoid inadvertent retraction of the inner tube 20.

Although the invention has been explained in relation to its preferred embodiment, it is to be understood that many other possible modifications and variations can be made without departing from the scope of the invention as hereinafter claimed.

What is claimed is:

1. A cargo positioning device comprising:
   an outer tube having a first end and a second end;
   an inner tube having a first end and a second end, the second end of the inner tube being telescopically received in the second end of the outer tube, at least one of the first end of the outer tube and the first end of the inner tube having an inner threading for threadedly engaging with a screw;
   means for releasably securing the outer tube and the inner tube together; and
   means for turning the inner tube and the outer tube that are secure together to cause the screw to move relative to the inner tube and the outer tube.

2. The cargo positioning device as claimed in claim 1, wherein the inner tube includes a plurality of longitudinally spaced positioning holes, the securing means including a transverse hole defined in the outer tube and a pin removably extended through the transverse hole and one of the positioning holes of the inner tube that is aligned with the transverse hole.

3. The cargo positioning device as claimed in claim 1, wherein the turning means includes:
   a base having a: first end rotatably mounted around the outer tube and a second end;
   a ratchet wheel securely mounted around the outer tube to rotate therewith;

a handle having an end engaged with the second end of the base to rotate therewith; and means for turning the ratchet wheel in response to rotation of the handle, thereby causing rotation of the inner tube and the outer tube that are secured together.

4. The cargo positioning device as claimed in claim 3, wherein the handle is pivotally mounted to the second end of the base.

5. The cargo positioning device as claimed in claim 3, wherein the means for turning the ratchet wheel includes a pawl pivotally mounted to the base, the pawl including a first engaging section and a second engaging section that are selectively engaged with the ratchet wheel to drive the ratchet wheel in a selected direction, the base further including a receptacle, an elastic element mounted in the receptacle, and a ball mounted in the receptacle and biased by the elastic element to selectively retain the pawl in one of two positions for determining engagement of the ratchet wheel with one of the first engaging section and the second engaging section of the pawl.

6. The cargo positioning device as claimed in claim 5, wherein the base is U-shape and includes two limbs Saving aligned holes so as to be rotatably mounted around the outer tube.

7. A cargo positioning device comprising:

an outer tube having a first end and a second end, the first end of the outer tube having an inner threading for engaging with a first screw, a first end plate being securely attached to the first screw to move therewith, the outer tube further including a transverse hole;

an inner tube having a first end and a second end, the second end of the inner tube being telescopically received in the second end of the outer tube, the first end of the inner tube having an inner threading for threadedly engaging with a second screw, a second end plate being securely attached to the second screw to move therewith, the inner tube further including a plurality of longitudinally spaced positioning holes;

a pin removably extended through the transverse hole and one of the positioning holes of the inner tube that is aligned with the transverse hole to thereby secure the inner tube and the outer tube together; and means for turning the inner tube and the outer tube that are secured together to cause the first screw and the second screw to move relative to the inner tube and the outer tube.

8. The cargo positioning device as claimed in claim 7, wherein the turning means includes:

a base having a first end rotatably mounted around the outer tube and a second end;

a ratchet wheel securely mounted around the outer tube to rotate therewith;

a handle having an end secured with the second end of the base to rotate therewith; and means for turning the ratchet wheel in response to rotation of the handle, thereby causing rotation of the inner tube and the outer tube that are engaged together.

9. The cargo positioning device as claimed in claim 8, wherein the handle is pivotally mounted to the second end of the base.

10. The cargo positioning device as claimed in claim 8, wherein the means for turning the ratchet wheel includes a pawl pivotally mounted to the base, the pawl including a first engaging section and a second engaging section that are selectively engaged with the ratchet wheel to drive the ratchet wheel in a selected direction, the base flier including a receptacle, an elastic element mounted in the receptacle, and a ball mounted in the receptacle and biased by the elastic element to selectively retain the pawl in one of two positions for determining engagement of the ratchet wheel with one of the first engaging section and the second engaging section of the pawl.

11. The cargo positioning device as claimed in claim 10, wherein the base is U-shape and includes two limbs having aligned holes so as to be rotatably mounted around the outer tube.

12. The cargo positioning device as claimed in claim 11, wherein the outer tube includes two positioning grooves in an outer periphery thereof, further comprising two C-clips mounted in the positioning grooves and located outside the limbs of the base to thereby position the base.

13. The cargo positioning device as claimed in claim 7, wherein the inner threading of the inner tube and the inner threading of the outer tube have opposite leads.

\* \* \* \* \*